United States Patent [19]

Pittman

[11] 4,176,653
[45] Dec. 4, 1979

[54] INFLATABLE ENCLOSURE AND ENERGY EXCHANGE SYSTEM

[76] Inventor: Turner J. Pittman, P.O. Box 24, Logan, N. Mex. 88426

[21] Appl. No.: 770,264

[22] Filed: Feb. 22, 1977

[51] Int. Cl.² .......................... F24J 3/02; F24H 7/00
[52] U.S. Cl. ........................................ 126/428; 52/2; 237/1 A; 126/400
[58] Field of Search ............... 126/270, 271, 400; 237/1 A; 52/2, 11, 14; 165/47, 48, 53, 56

[56] References Cited

U.S. PATENT DOCUMENTS

| | | | |
|---|---|---|---|
| 3,910,253 | 10/1975 | Thomason et al. | 126/271 |
| 3,931,851 | 1/1976 | Harris et al. | 165/2 |
| 4,000,850 | 1/1977 | Diggs | 126/271 X |
| 4,004,380 | 1/1977 | Kwake | 52/2 |
| 4,011,989 | 3/1977 | Diggs | 165/56 X |
| 4,027,437 | 6/1977 | Monsky et al. | 52/2 |
| 4,054,246 | 10/1977 | Johnson | 126/400 X |

Primary Examiner—William F. O'Dea
Assistant Examiner—Larry Jones
Attorney, Agent, or Firm—Turner J. Pittman

[57] ABSTRACT

A flexible water-impervious roof with a rigid peripheral structure provides support for a plurality of distinct and separate portions of liquid in a system that provides for repeated cycling of heat energy between its roof and its ground reservoir. The flexible roof is formed into a plurality of upwardly open incremental reservoirs which have walls in the form of dimples or tractrices and held in shape by a low-pressure gaseous support. The mechanical system that provides the gaseous roof support also provides the motive force for movement of the thermal energy exchange liquid from the positions thereof wherein energy is absorbed in such liquid to the positions thereof whereat such thermal energy is stored and/or disposed.

5 Claims, 16 Drawing Figures

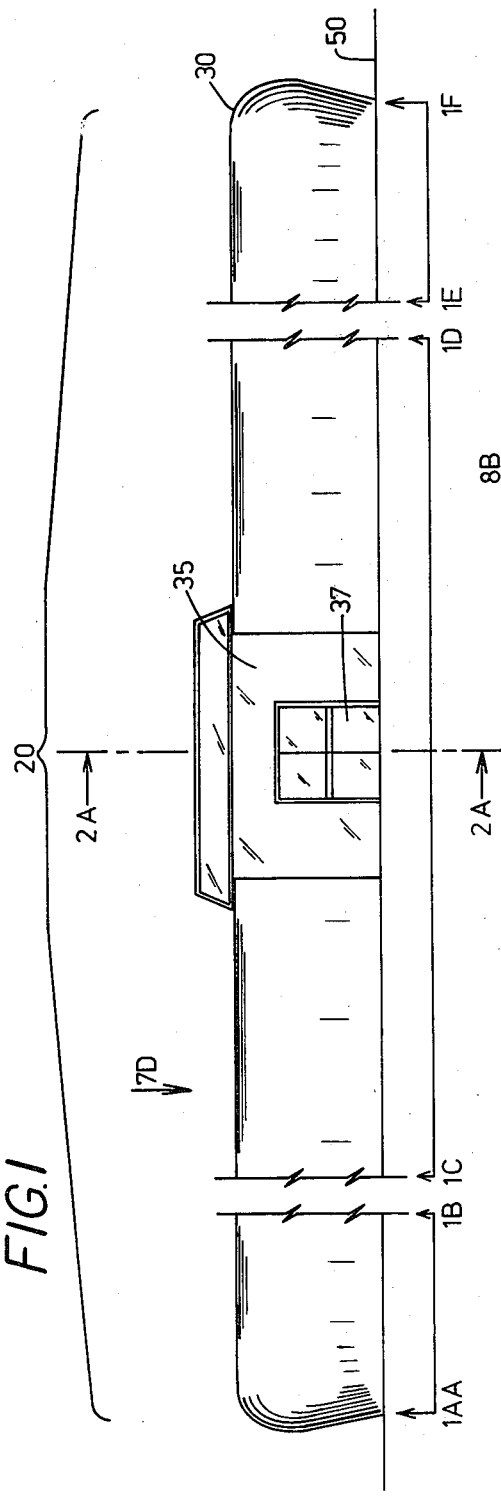
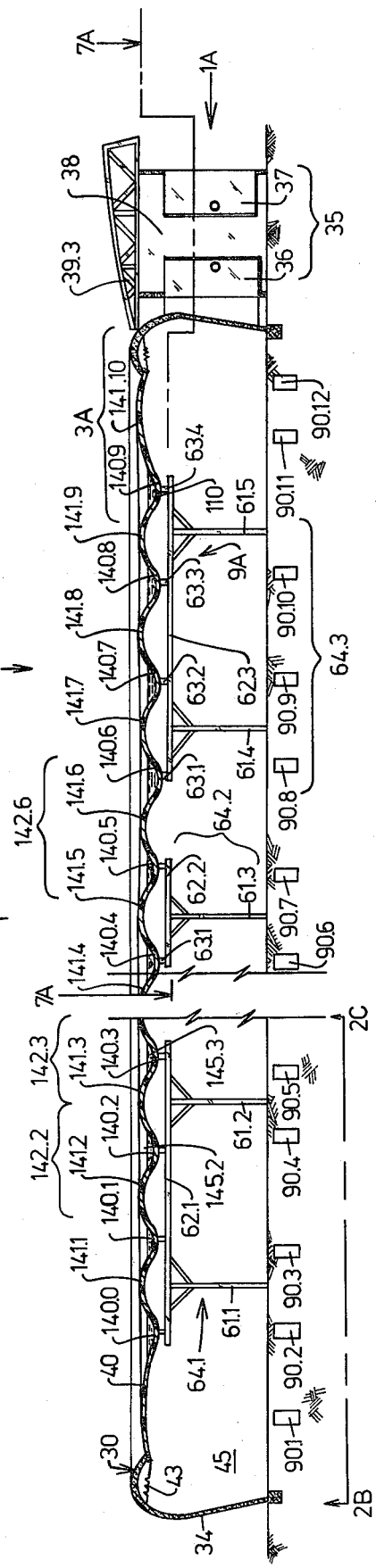
FIG.1
FIG.2

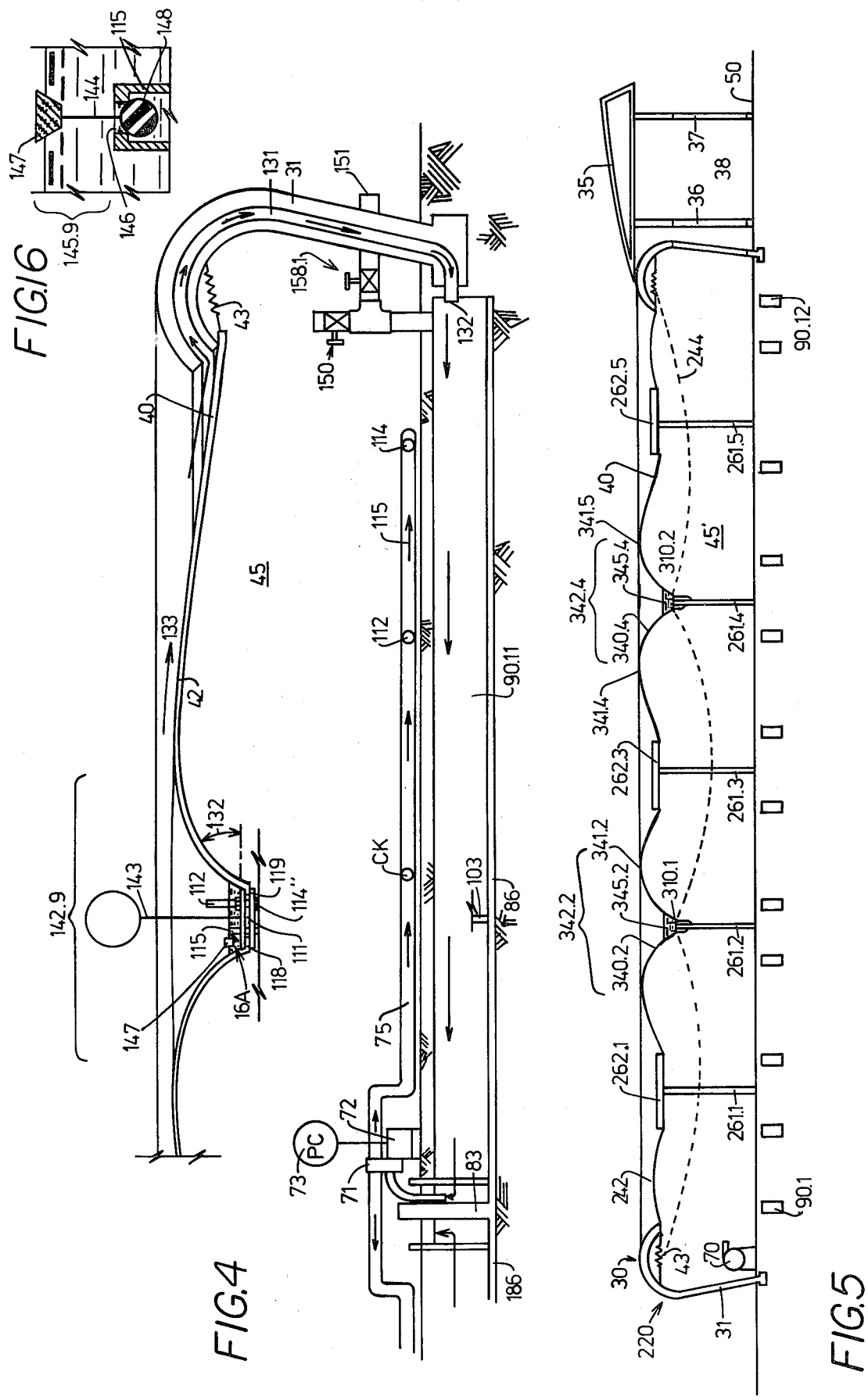

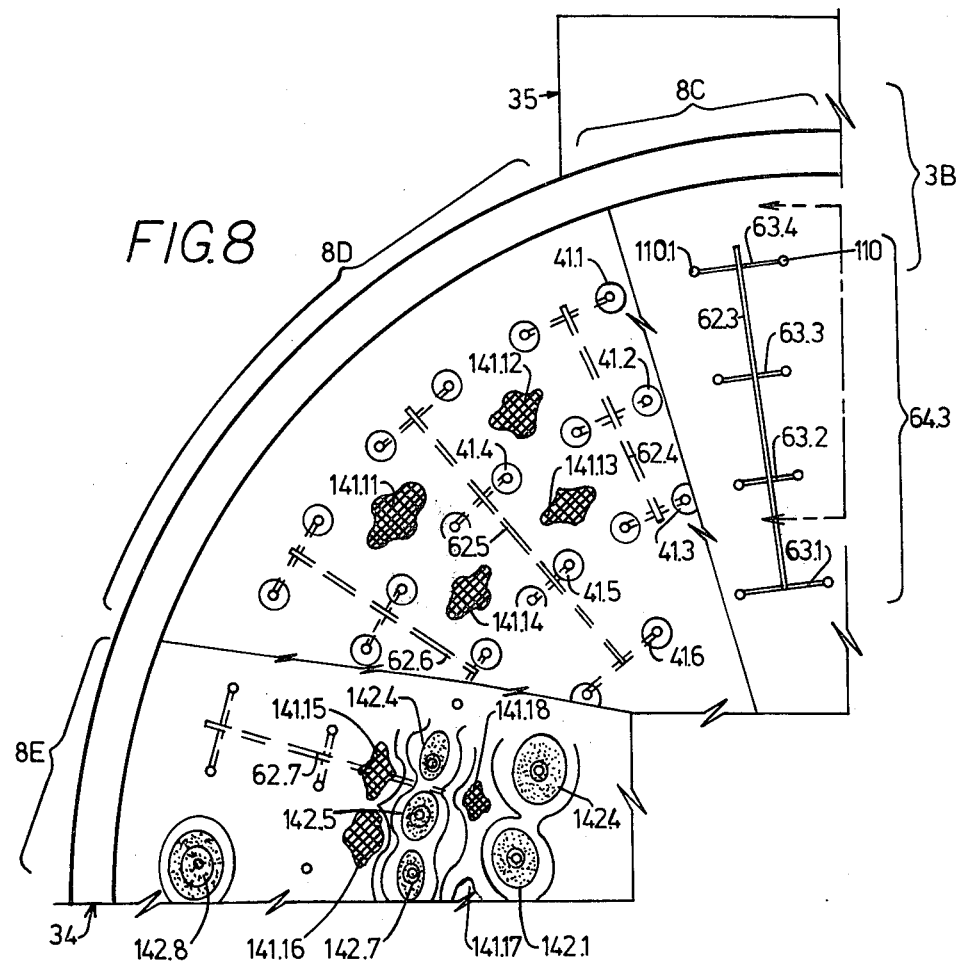
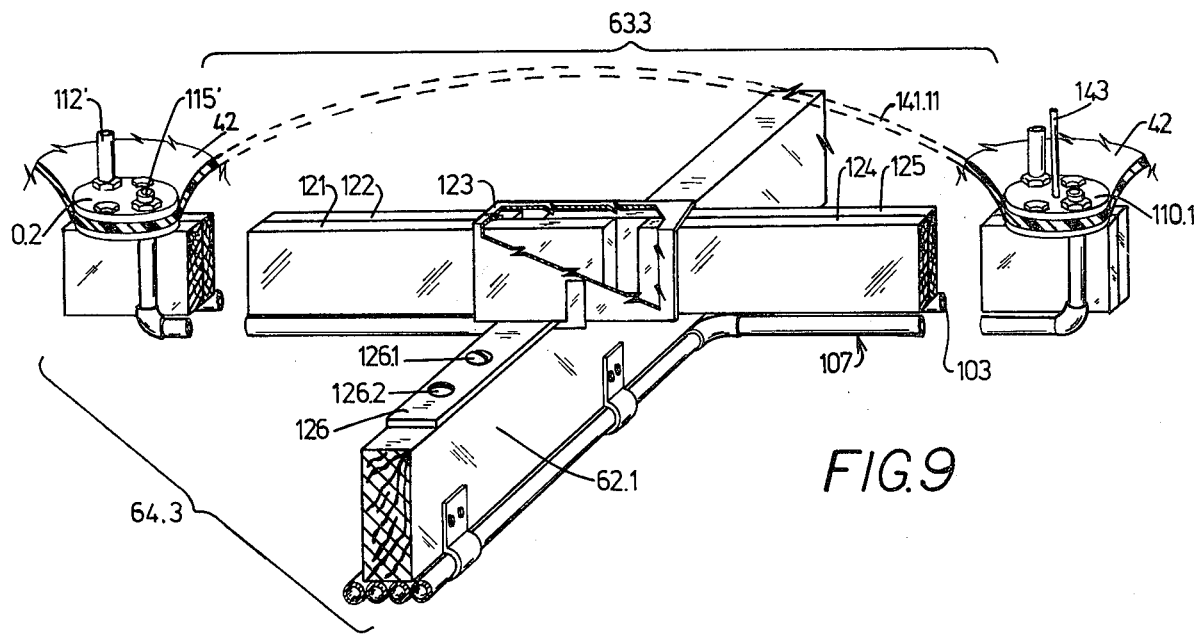

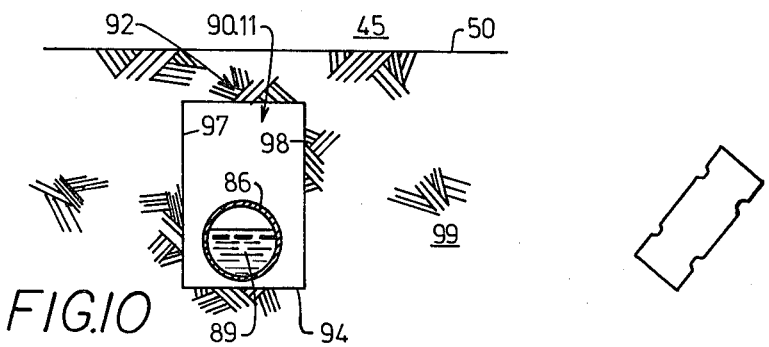
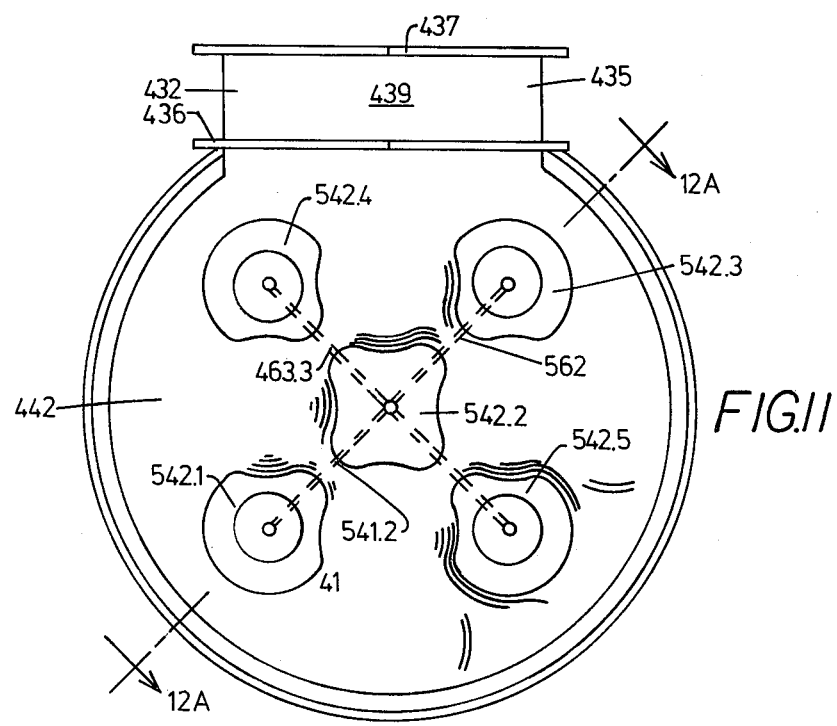
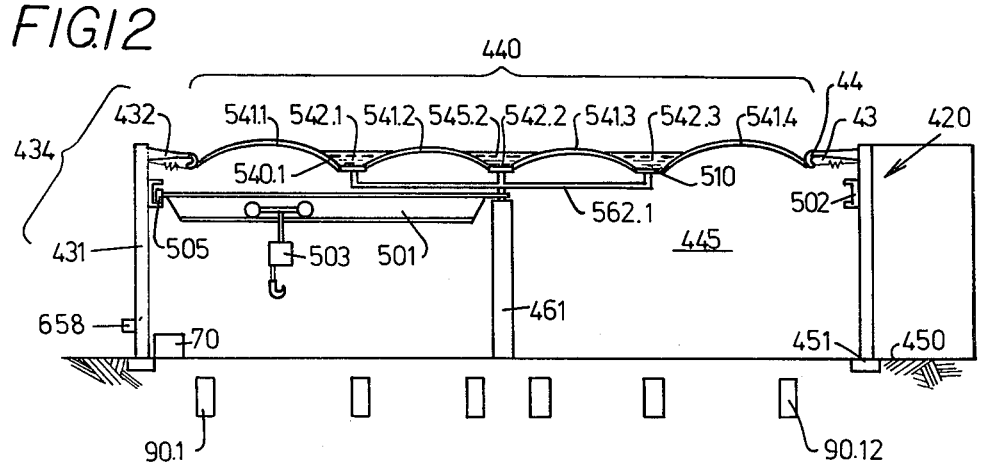

INFLATABLE ENCLOSURE AND ENERGY EXCHANGE SYSTEM

BACKGROUND OF THE INVENTION

1. The Field of the Invention

The fields of art to which this invention pertains are building structures shaped by fluid pressures and including a compound curve cover.

2. Description of the Prior Art

Conventionally built constructions require a roof and, more recently, heat transfer mechanisms have been applied thereto. However, conventional roofing systems are expensive to construct and as the area thereof increases the cost increases due to beam strength and cost requirements. Conventional solar energy systems are hail sensitive and conventional domed structures have excessive enclosed height which require large heat energy input to keep the resultant large volumes thereof warm or cool.

The instant apparatus is particularly directed to storage buildings, greenhouses and livestock enclosures, and buildings used for temporary construction. It provides for large useful work areas of low construction and operating cost and relative insensitivity to hail conditions.

SUMMARY OF THE INVENTION

A substantially air-tight enclosure is formed with vertically extending air-tight walls supported in the ground and a roof formed of a thin and flexible watertight and air-tight sheet supported on the walls. The sheet forming the roof is formed into a regular array of a plurality of dimpled or downwardly extending upwardly open containers—referred to herein as incremental roof reservoirs—of substantially the same shape and size to hold volumes of water that are shallow and wide and separate from each other so that they have effectively the same surface-volume characteristics.

A slight but definite excess of air pressure in the enclosure over the pressure outside the air-tight enclosure holds and urges some portions of the roof upward to raised positions while attachment of a rigid ground-supported frame structure to other portions of the sheet adjacent the raised portions produces dimpled portions of the sheet forming the roof. The dimpled portions and the frame attached thereto support liquid conduit terminal that carry water to and from the incremental roof reservoirs in the dimpled portions of the roof. Conduits and pumps and temperature and liquid level sensors and controls connect the water in the incremental roof reservoirs to conduits in the ground for transfer of the water between the incremental roof reservoirs and trenches in the ground that act as heat reservoirs.

An air stream pump and conduit system provides for heat energy transfer between the roof and ground reservoirs and provides for maintaining a small but definite pressure in excess of that outside the enclosure for producing and maintaining the relative depth of dimpled and raised portions of the sheet forming the enclosure roof notwithstanding the weight of water supported thereon whereby many relatively shallow and separate bodies of water are supported at a low internal pressure and in sufficiently similar shapes and sizes to provide for similar heat transfer characteristics over the different portions of the roof.

The attachment of the dimpled sheet forming the roof to frame structure and the excess of length along the roof surface over linear distance between dimples and height of raised portions of the roof prevents shifting of the location of the bodies of water in the roof reservoirs. The frame structure provides for adjustment of the distances between dimples in the roof to provide for separation of the incremental roof reservoirs' low points.

These structures are inexpensively and rapidly constructed and stable and make particular effective use of ground and solar heat energy during their period of use.

In the operation mode of heating the enclosure the bodies of water held in the incremental roof reservoirs absorb heat from the sun and are warmed and are passed to ground reservoirs where such waters warm the ground reservoirs in progressive fashion and such heat is later absorbed by moving air streams passing through the warmed ground reservoirs, warmed thereby and passed to the enclosure which is warmed by such streams. Additionally as the ground reservoirs are initially at about 55°–60° F.: water stored therein is passed to the incremental roof reservoirs and, such water at ground temperature or at warmer temperatures provided by the solar energy absorption passes heat through the thin walls of those depressed or dimpled roof portions and, in cold weather warms the enclosure upward at least to ground temperature. The thin transparent roof also transmits the suns rays into the enclosure through the portions of the dimpled sheet not covered by water to warm the enclosure.

The same ground and roof and air stream developing structures operates in warm weather to cool the enclosure by evaporation of water in the incremental roof reservoirs to produce and place cooled water into the ground reservoirs and also to transfer water at ground temperature or lower to the incremental roof reservoirs to cool the enclosure interior by transfer thereto of air cooled by either or both (a) the theretofore cooled ground reservoir and (b) the thin roof surfaces in contact with the water initially at or below ground temperature and located in the incremental roof reservoirs.

BRIEF DESCRIPTION OF THE DRAWINGS

FIG. 1 is a diagrammatic partial front view of one embodiment of this invention taken along direction of arrow 1A of FIG. 2. This figure shows portions shown as Zones 1A–1B, 1C–1D, and 1E–1F of FIG. 7. Portions 1B–1C and 1D–1E are omitted in this figure for purposes of clarity of representation inasmuch as those omitted portions are similar to the shown portions adjacent thereto.

FIG. 2 is a longitudinal vertical sectional view along the vertical plane 2A—2A of FIG. 1 to show the portions 2B–2C and 2D–2E thereof, the locations of which portions are shown in FIG. 7.

FIG. 8: it diagrammatically shows some functional relations of the components of the operating system exclusive of the enclosure 35.

FIG. 4 is a diagrammatic vertical longitudinal sectional view generally as in FIG. 3 of a variant of wall structure according to this invention and also showing details of the blower distribution system used in apparatus of FIGS. 1–12. This figure shows a lesser amount of water in the incremental reservoir portion 142.9 than is shown in FIG. 3 to illustrate a change in shape of the roof structure.

FIG. 5 is a diagrammatic longitudinal vertical sectional view generally as shown in FIG. 2 of another embodiment of roof locating and forming structure according to this invention.

FIG. 7 is drawn to scale to show the main subassemblies of structural support assembly 60 in portion 7B. Portion 7C of FIG. 7 is a overall top view of the assembled apparatus as seen in direction of arrow 7D of FIG. 1; the figure is directed to show the array of centers of reservoirs—as 242.1, 242.4, 242.5, 242.7, 242.8—, (amongst others) like 142.9 and formed on the roof layer 42.

FIG. 8 is a diagrammatic composite view of quadrant 8A of FIG. 7, and shows portions 8C, 8D, and 8E. Portion 8C of FIG. 8 is a top view of a portion of apparatus 20 with the roof layer 42 removed to show representative structures of assembly 60 therebelow. Portion 8D of FIG. 8 is a view of portion of the assembled apparatus 20 in operative position with the roof layer 42 attached: the dotted are the most elevated portions of the layer 42 and the adjacent portions of assembly 60 below the layer 42 are shown in dashed lines. Quadrant 8A is bounded by radii 8F and 8G and wall 31.

In portion 8E of this figure contour lines of the roof layer 42 are shown with the incremental reservoir assemblies on the roof adjacent thereto shown hatched.

FIG. 9 is a detail of structure in Zone 9A of FIG. 2.

Figure 3:
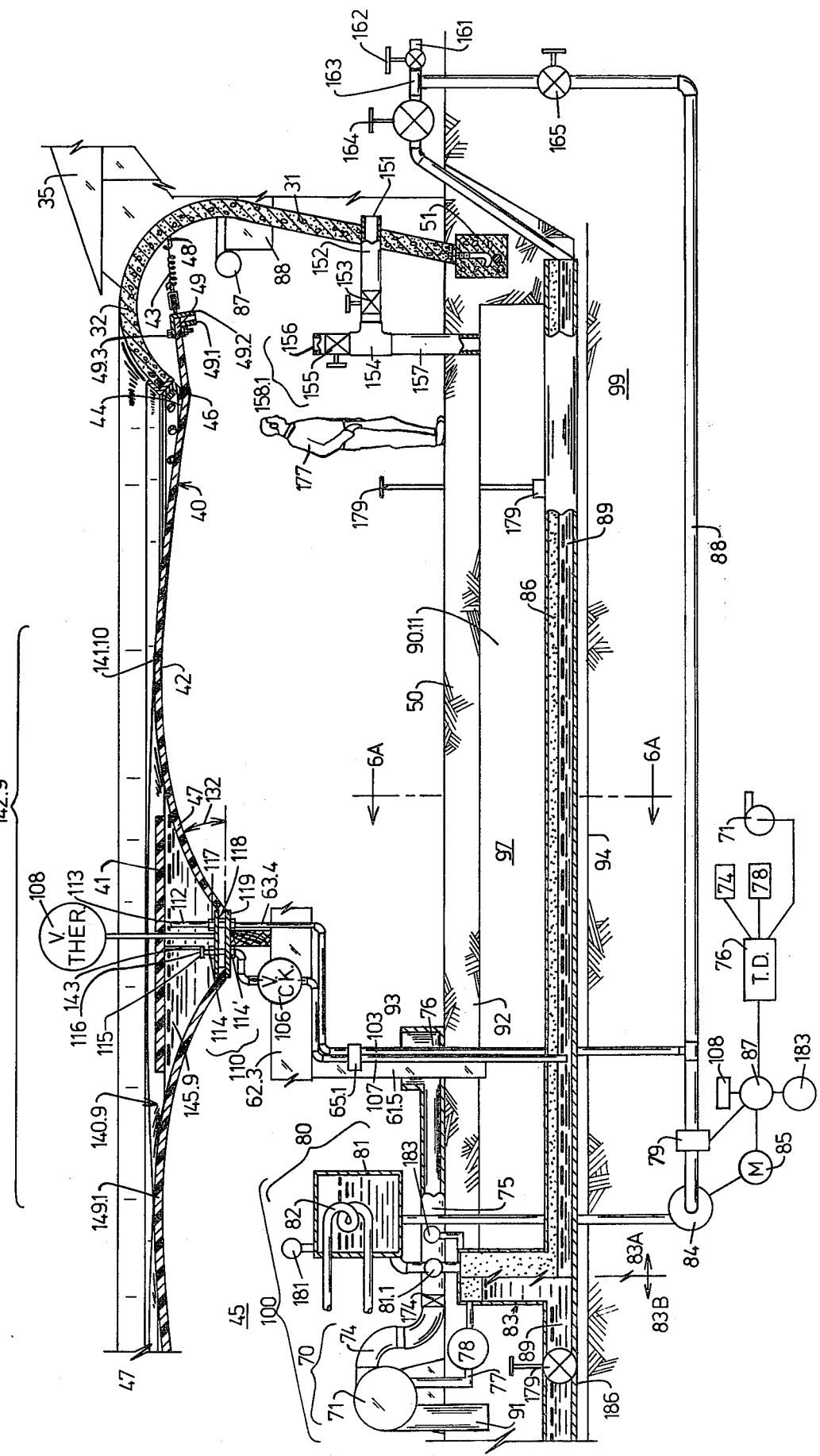
FIG. 3 is an enlarged diagrammatic vertical longitudinal sectional view in a zone as Zone 3A of FIG. 2 and Zone 3B

FIG. 10 is a diagrammatic vertical cross-sectional view of one of the trenches shown in FIG. 2 along Section 10A—10A of FIG. 3. FIG. 11 is a top view of a structure as in FIG. 12 according to this invention. FIG. 12 is a vertical longitudinal section along vertical plane 12A—12A of FIG. 11.

Figure 13:
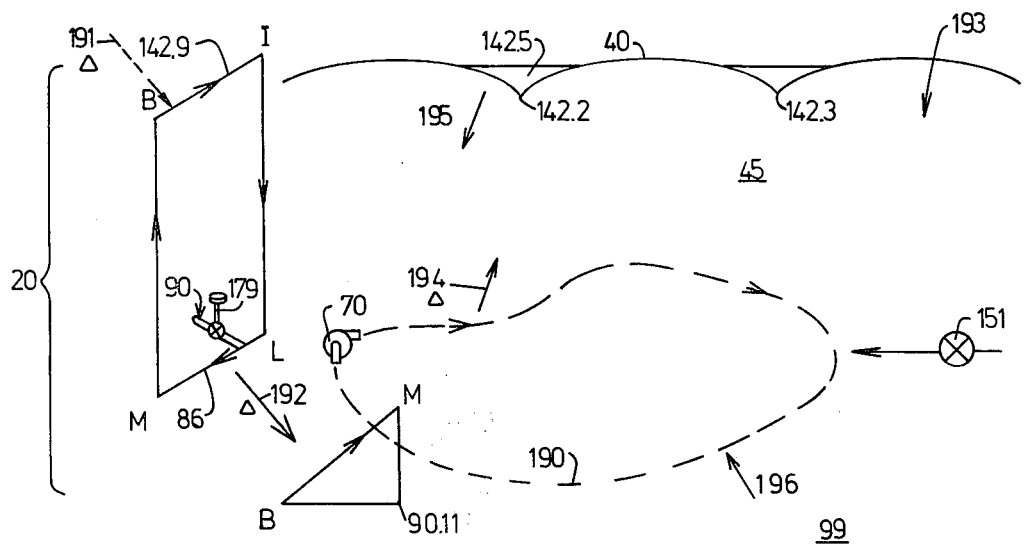

FIG. 13 is a diagrammatic representation of cycles that occur in apparatus 20 during the use of that apparatus for warming air in the enclosure 45.

Figure 14:
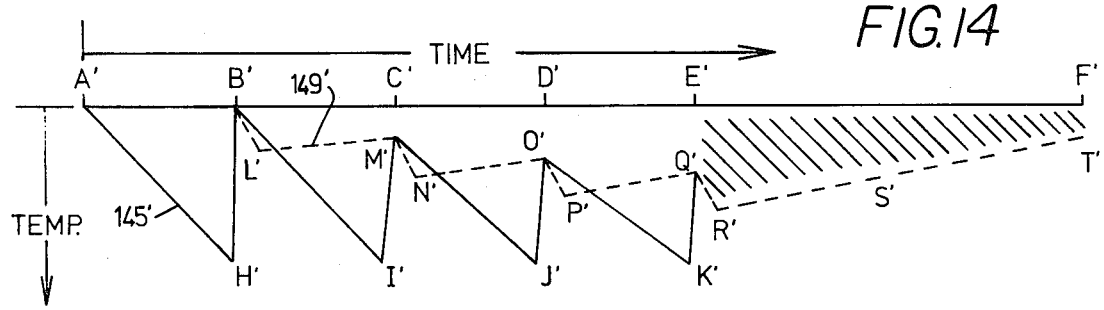

FIG. 14 is a diagrammatic representation relation of operating time of apparatus 20 and the temperature of the water in the roof reservoirs and the ground reservoirs during operation for cooling enclosure 45.

Figure 15:
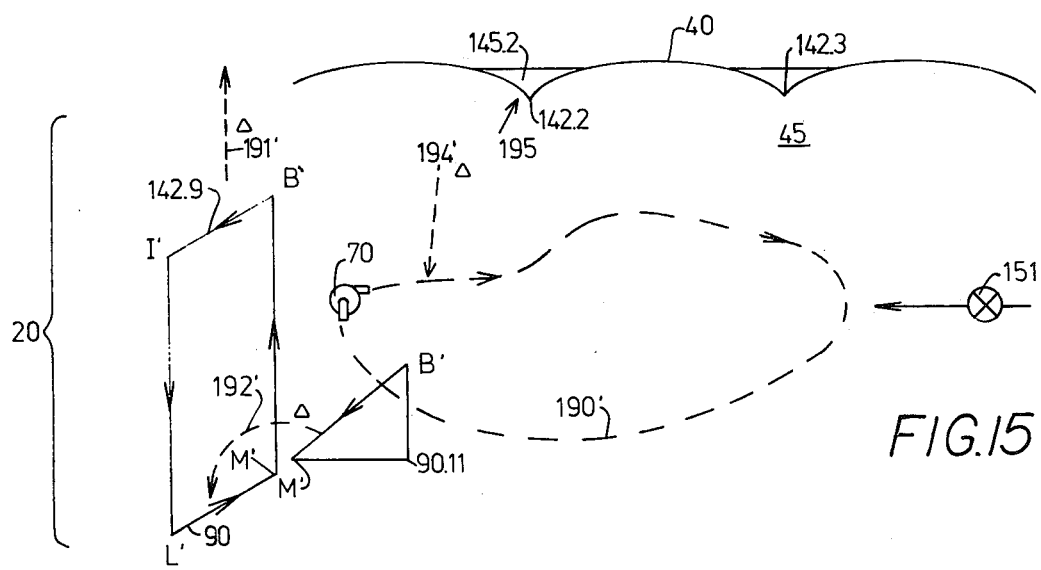

FIG. 15 is a diagrammatic representation of cycles that occur in apparatus 20 during the use of that apparatus for cooling air in the enclosure 45 by evaporation.

FIG. 16 is a diagrammatic enlarged view of zone 16A of FIG. 4 when the reservoir as 142.9 of FIG. 3 of FIG. 4 is full of water as 145.9.

Zone 83B of FIG. 2 shows the tank 83 when filled to a height higher than the level of the like lines 86 and 186 that are connected thereto. Zone 83A shows the water level in tank 83 and pipe 86 when the water in tank 83 is at such a low level that line 86 is only partly filled with water.

In FIG. 15 dashed line 244 shows the position of layer 242 when the blower system 70 in apparatus 220 does not operate to raise the layer 242 into its operative position for forming incremental roof reservoirs as 342.2 and 342.4; the full line indicated by reference numeral 242 shows the operative position of layer 242.

DESCRIPTION OF THE PREFERRED EMBODIMENTS

The apparatus 20 comprises a vertically elongated roof edge support assembly 30, a roof portion 40, an internal structural support assembly 60, a blower system 70, and a heat transfer system 100 and an air inlet system 150.

As shown in FIGS. 2 and 3 in particular the roof edge support assembly 30 comprises a wall structure 34 and a tensioning member 43, a tension support 48 and a roof sealing member 44. The wall structure 34 comprises a circular imperforate air-tight rigid vertically extending peripheral wall 31 which is fixed to a foundation and has substantial thickness and rigidity and an airtight annular horizontally extending raised central wall portion 32. Portion 32 extends centrally and horizontally from the upper end of wall 31. An annular sealing flange 44, which is Vee-shaped in cross-section, extends centrally and downwards from the lower inner edge of the wall. The bottom of wall 31 is firmly located on the ground 50 in a peripheral wall foundation 51. The foundation 51 is a rigid annular concrete mass that is not shiftable in the ground 50 and is stable vertically and does not rotate or twist.

Figure 7:
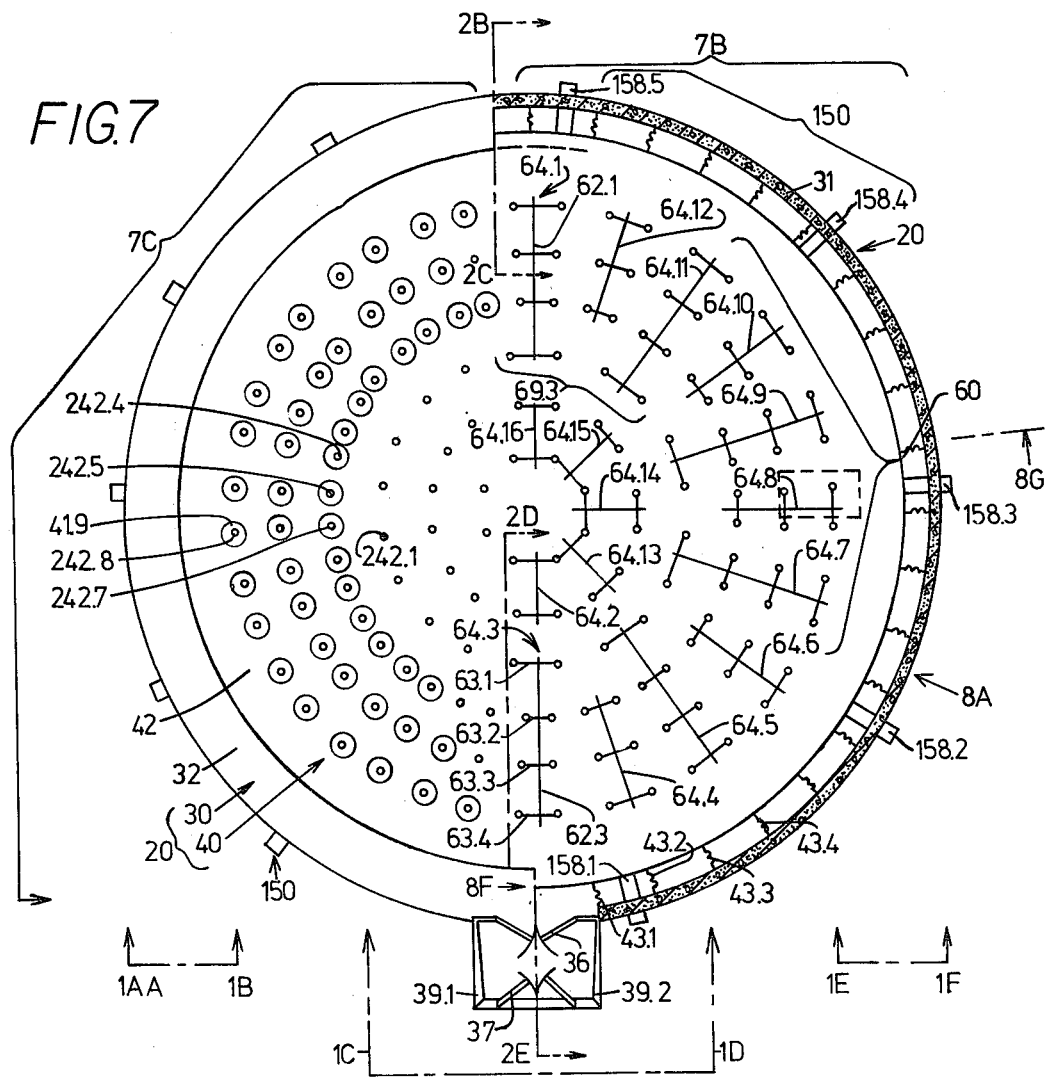
FIG. 7 is a composite plan and transverse sectional view: the right hand part of this figure, portion 7B of FIG. 7, is a horizontal sectional view along a plane generally as shown as 7A—7A of FIG. 2 taken immediately below the bottom of the roof 40 to show the array of parts of assembly 60 below the roof.

The flexible imperforate roof portion 40 comprises a plurality of upper incomplete portions as 41 and 41.1-41.9 and a lower complete imperforate air-tight flexible yet dimensionally stable layer 42. The lower complete layer 42, shown in FIGS. 2 and 3, extends from one side of the peripheral roof support assembly 30 to the other side thereof as shown in FIG. 2 and past the seal 44 to the peripheral roof edge 49. The layer 42 is formed into an array of a plurality of downwardly dimpled areas, as 140.1-140.9 and upwardly convex areas as 141.1-141.9. The most peripheral of the raised areas are located by assemblies 60 and 70 to be higher at their highest points as 142.1-142.9 than the portions of layer 42 in contact with the circular seal 44. Ells as 49.1 and 49.2 that are firmly held together by bolts as 49.3 clamp the edge 49 of the layer 42 therebetween. One end of a spring support 48 fixed to wall 31 attaches to the upper lateral end of an adjustable spring 43 at a height greater than the height of the bottom edge of sealing ring 44. Each spring as 43 and 43.1-43.4 is attached at its lower central end to ells as 49.1 and 49.2 and extends upwardly and laterally (or radially) to the spring support therefor, as 48, on wall 31. The bottom edge of flange 44 which extends downwardly from the inner edge of roof portion 32 firmly contacts the top of layer 42. Each of the springs as 43 and 43.1-43.4 is evenly circumferentially spaced around edge 49, as shown in FIG. 7, and acts on an adjacent portion of the peripheral edge 49 of roof layer 42 to firmly hold it in tension upward against the edge of flange 44, and thereby, with the shaping of layer 42 provided by blower system 70 and location of layer 42 provided by assembly 60, forms a substantially air-tight contact between the bottom edge of flange 44 and the top of the flexible roof layer 42 at the line of contact 46 therebetween. This line of contact 46 creates an substantially and effective air-tight enclosure 45 above the ground zone 50 between the wall structure 34 and the top surface of the ground 50 below the roof layer 42. Other air-tight attachments may also be used to connect the roof layer 42 to the peripheral structure 34 and form a substantially air-tight enclosure therewith.

The internal structural support assembly 60 comprises a plurality of generally like internal frame subassemblies 64.1–64.14 arrayed in an axially symmetrical arrangement (as shown in FIG. 7, for one half of the roof layer 42) under both halves of the roof layer 42. The sub-assemblies 64.1 and 64.2 and 64.3 are shown in varied detail in FIGS. 2, 3, 6, 7 and 9 and are representative of all the other subassemblies of the assembly 60 hence the description of subassembly 64.3 applies to all such other subassemblies, as 64.1–64.14 of assembly 60 shown in FIG. 7.

Each frame subassembly as 64.3 comprises a pair of like rigid vertically extending support posts as 61.4–61.5, intermediate radial rails as 62.3, and tangential rails 63.1–63.4. Each of the vertical posts 61.4 and 61.5 are firmly supported at their lower end in the ground 50 and are rigid and, at their upper ends are firmly attached to and support an elevated radially and horizontally extending rigid rail as 62.3 as shown in FIGS. 2, 3 and 7. Each of the horizontally radial rails as shown in FIGS. 7 and 9 are elevated and in turn support and are attached firmly to a plurality of rigid, elevated, horizontally and tangentially extending and longitudinally extensible tangential rail assemblies 63.1–63.4. Each end of each of the tangential rail assemblies as 63.4 support an upper thermal fluid conduit terminal support assembly as 110 thereon as in FIG. 3;—e.g. assembly 63.3, which, like 63.4 comprises an extensible tangential rail assembly like assembly 63.4, supports assemblies 110.1 and 110.2. Assemblies 110.1 and 110.2 are each like upper thermal fluid conduit terminal support assembly 110 and are firmly supported near or at the ends of the assembly 63.3 as shown diagrammatically in FIG. 9. The assemblies as 110 and 110.1 provide for location and positioning of the portions of the roof assembly 40 adjacent thereto.

The assembly 60 thus provides a plurality of angularly equispaced elevated radially extending rails as 62.2 and 62.3 in assemblies as 64.2 and 64.3 and like rails in assemblies 64.1–64.16 and provides for supporting the assemblies as 110, 110.1 and 110.2 in a relatively evenly spaced array (as in FIG. 7) for substantially equal distance between each of such assemblies as 110 and 110.1. Each rail assembly as 63.3 comprises rigid tangential rails made of 1" by 4" lumber as 121, 122, 124 and 125 which are held together at a rigid steel sleeve 123 as shown in FIG. 9 and that sleeve is firmly fixed to a rigid flange 126 which in turn is firmly fixed as by bolts 126.1 to the rail 62.1. The sleeve 123—shown broken away in FIG. 9—provides for positioning and supporting the rigid transverse rails as 121, 123, 124, and 125 yet permitting them longitudinal motion to provide for adjustment of the distance between assemblies as 110.1 and 110.2 supported at the ends of each assembly as 63.3. This structure provides for spacing of those assemblies as 110, 110.1 and 110.2 so that the bodies of water as 145.9 located thereabove in operation of the apparatus 20 will be relatively evenly spaced over the roof structure 40 and separate from each other.

Each upper conduit terminal support assembly as 110 comprises a rigid high level vertical pipe 112 and a rigid low level vertical pipe 115, an upper rigid clamping plate 117 and a lower rigid clamp plate 119. The high level pipe 112 and a low level pipe 115 are firmly attached to upper plate 117 while lower plate 119 is firmly attached to the assembly 63.4 as shown in FIG. 3. The upper plate 117 and the lower plate 119 are also firmly attached together and clamp therebetween a portion 118 of the layer 42. Pipe 115 has a closure valve at its upper end. The upper open end 113 of the high level pipe 112 is higher than the upper open end 116 of the low level pipe 115. Nuts as 114 and 114' on the pipes 112 and 115 serve as clamping means for the plates 117 and 119. A space 111 is provided in the portion 118 of the layer 42 for the vertical passage of the pipes 112 and 115. The nuts attached to the pipes 112 and 115 act as a clamp and help form a fit between those pipes and plates 117 and 119 and portion 118 of layer 42 which is airtight. The orifice 111 also permits locating layer 42 on pipes 112 and 115 on the plate 119 during location and raising of the roof 40.

A blower system 70 comprises an air pump 71, a motor 72 and a pressure control 73. The pump 71 drives air into the enclosure 45 under the roof 40. The pressure control 73 is sensitive to the pressure in the chamber 45 and operatively connects to the power source for motor 72. An air tight entrance enclosure 35, comprising a pair of doors 36 and 37 spaced apart by a space 38 and also comprising entrance side walls 39.1 and 39.2 and roof 39.3 and enclosing the entrance space 38 provides for ingress to and egress from the ground surface or area within the enclosure 45 under the roof 40 while maintaining the air pressure in the enclosure 45. In order to provide convenient access to enclosure 45 each pair of doors 36 and 37 form a substantially air-tight seal when closed and swing from closed position in opposite directions to open. Blower 71 has an inlet 91 located in trenches as 90.11 and has two discharge outlets, a first discharge outlet 74 attaches by a plurality of air distributor pipes as 75 to outlets as 76 each adjacent a post as 61.5 to evenly distribute discharge air into the volume 45 and thereby provide an even pressure of about 0.5 pound per square inch gauge in chamber 45 to maintain the curved shape of the layer 42 (as shown in FIGS. 2 and 3) adjacent to each assembly as 110. The blower 71 has a second outlet 77 attached to the tank 83 through a remote control valve 78 for pressurization of the liquid 89 therein as needed and there is a valve 174 in line 74.

The air inlet system 150 comprises a plurality of like valved air duct assemblies, as 158.1–158.5. One such air duct assembly, as 158.1 comprises an air inlet pipe or duct 152 with an outside orifice 151 located outside of the wall 31; the duct 152 thereof connects to a tee 154 through a large opening gate valve or damper 153. One arm of tee 154 connects via a large opening valve 155 to enclosure orifice 156 which is open to the enclosure 45; another arm of tee 154 connects a large diameter conduit duct 157 to trench 90. Opening valve or damper 153 and closing valve or damper 155 provides for admitting and adding air to enclosure 45 and closing of valve 153 and opening valve 155 provides for recirculating air from enclosure 45 through the trench 90 to blower 71 via inlet 91 thereof.

A heater system 80 comprises a heater tank 81 with a heat exchange coil 82 therein. The tank 81 is connected to a hot water reservoir tank 83 and the tank 81 is connected to the output of pump 84. A drive motor 85 is controlled by a sensor 108 through a relay 87 located in a control box 88. During start up of the system water is fed to the heater 81 and there warmed by the coil 82 and passed to the reservoir 83. In the reservoir tank 83 air is pressurized and drives water therefrom through each of several distribution pipes as 86 at bottom of each of trenches as 90.1–90.12 to each of the roof reservoirs as 142.9. Water 89 for the heater system is provided by source line 161 through cut off valve 162 and tee 163 to collector conduit line 88 via valve 165. A usually closed cut off valve 164 functionally separates and mechanically connects lines 88 and 86. Valve 164 is opened to empty the system. Line 88 is shown as below line 86 only for illustration purposes.

In its operative position as shown in FIGS. 2 and 3 the circular roof layer 42 is formed into an array, which array is axially symmetrical about its center, of a plurality of recessed incremental upwardly open reservoir wall portions as 140.0–140.18 and upwardly convex elevated zones as 141.1–141.18: the elevated zones, as 141.1 through 141.10, alternate with and are adjacent to the reservoir wall portions, as 140.0–140.9 as shown in FIG. 2 in particular. The incremental reservoir wall portions as 140.0 through 140.10 are all alike so that the description of one such wall portion 140.9, herein given applies to all. Each downwardly recessed reservoir wall portion as 140.9 and the upper conduit support assembly 110 adjacent thereto and attached to such wall portion form the container for an incremental roof reservoir as 142.9. The liquid reservoir portions 142.1 through 142.9 are all generally alike in shape and shown in FIGS. 2, 3 and 8. Each such reservoir as 142.9 includes a tractrix-shaped wall portion as 140.9, an assembly as 110 and a body of water as 145.9. Bodies of water corresponding to body 145.9 are located in each of the other reservoirs, such as body of water 145.3 in the reservoir assembly 142.3 on roof 40.

The heat transfer fluid system 130 comprises the totality of tractrix shaped roof portions as 140.0 to 140.10 and trenches as 90.1–90.12, the blower system 70 and, for each of the separate reservoir portions as 142.1–142.9—as shown for reservoir 142.9—conduits as 107 and 103 and distribution lines 86, a sensor unit 108, and related control valves connected thereto.

Lines 103 and 107 are liquid conduits supported by and attached to the vertical members as 61.4 & 61.5 (as shown in FIG. 3) and to the horizontally extending radial and tangential members of assemblies as 64.1–64.16 (as shown in FIG. 9 for assembly 64.3).

Each of the lines as 107 extends vertically between the below ground horizontally extending water distribution lines as 86 and a body of water as 145.9 in one of the reservoirs as 142.9.

Each liquid elevating pipe as 107 extends from near the bottom of a conduit as 86 upward through a check valve 106 to the bottom end of a low level pipe 115 and each pipe as 107 is connected in an air-tight manner to the conduit 86 so that pressurization of liquid in tank 83 may drive liquid as 89 in lines as 86 up lines as 107 to reservoirs as 142.9. The low level pipe 115 is locked in place at its bottom by nuts as 114 and 114' to plates 117 and 119 and firmly held in place thereby. The discharge pipe 103 extends from a below ground liquid return conduit 88 upward to the bottom end of a high level pipe 112. The high level pipe 112 is fixed in place at its bottom by nuts as 114" to plates 117 and 119 and held in place firmly thereby and does not connect to pipe 86 except through tank 81, check valve 81.1 and tank 83.

Each internal frame assembly as 64.1–64.4 provides firm yet adjustable support to the upper conduit terminal assemblies as 110 and 110.1 and 110.2 and maintains the pipes 112 and 115 vertical.

Each trench as 90.11 is substantially the same as the others as 90.1–90.12 and comprises a first vertical wall 97 and another vertical wall 98 and a bottom 94 and is, in the preferred embodiment a 24 inches high and 6 inches wide enclosure closed at its top by a roof 92 and extends in a straight line across the diameter or chord of the circular area 45. Each of the pipes as 86 lies in the bottom of a narrow trench as 90.11 spaced away from the walls thereof as 97 and 98 so that air flowing past such pipe may absorb the heat of the liquid, 89, in such pipe and adjacent ground 99 and pass such heat to the blower 71 and thence to the enclosure 45.

The air pressure generated in the enclosure 45 by the blower 71 produces a curved shape or deformation of the flexible roof layer 42 so that the height of portions as 141.9 over assemblies as 110 is about one foot when there is ten feet between the centers of assemblies as 110.1 and 110.2 whereby each roof reservoir as 142.9 then is about one foot deep and holds water to a depth of 9½ to 10½ inches and has a diameter of about six feet so that the periphery of the separate reservoirs as 142.9 are distinct and spaced apart from each other. One-half p.s.i.g. pressure supports pressure of one foot of depth of water. With greater distances as 12 feet between assemblies as 110.1 and 110.2 the reservoirs as 142.9 may have larger diameters and greater depths, e.g. a height from plates as 117 to peaks as 141.10 of 24 inches and a water depth of 17 to 18 inches. Greater pressures in chamber 45, as 1.0 p.s.i.g. are then used for apparatus 20.

A circular disc 41 formed of imperforate plastic and generally same material as layer 42 and bouyant in water and transparent to ultraviolet light is attached to a rod 143 or string which rod or string is attached to the top plate 117 of each assembly as 110; each disc as 41 floats on the top of a body of water as 145.9 in each water reservoir as 142.9 coaxial with center of plate 117 and serves to reduce evaporation therefrom while permitting warming radiation of sunlight to pass therethrough to the body of water 145.9 therebelow.

A float 147 is attached by a string 144 to a valve plug 148 which, in the elevated position of top of water body as 145.9, as shown in FIG. 16, seals a restricted opening 146 on a pipe plug on the top of pipe 115 and thereby controls the maximum height of water fed in back reservoir at 142.9.

The apparatus 20 is constructed by erecting support assembly 30, placing the subassemblies as 64.11–64.18 of assembly 60 as shown in FIGS. 9 and 2 and forming trenches as 90.1–90.10.

The floor 50 is substantially level and the tops of all assemblies as 110 on the subassemblies as 64.1–64.18 of assembly 60 are at substantially the same height within usual construction house construction practice. The edge 49 of the flexible layer 42 is then attached to the assemblies as 49.1–49.3, 48 and 43.1–43.4 on only one side of wall 31 (e.g. the right side as shown in FIG. 9). The flexible layer 42 is arranged with holes as 111 generally in position relative to the proposed final position of assemblies as 110 and is drawn over each of the support assemblies (as 64.1–64.16) with the holes 11 located surrounding or ringing pipes as 115 and 112 on plate as 119 therefor.

The portions of edge 49 opposite to those portions of layer 42 earlier attached to attachment assemblies as 48, 49.1–49.3 and 43.1–43.4 on one side of wall 31 are then attached to the portions of wall 31 (left side as shown in FIG. 9) opposite to the portions of one side of wall 31 to which portions of edge 49 of layer 42 were earlier attached using similar assemblies 48, 49.1–49.3 and 43.1–43.4.

Each plate as 117 is added later and held firmly in place against plate 119 by nuts as 114 and 114'. The plates 117 and 119 form a water-tight and air-tight fit with the portion 118 of layer 42 held therebetween and the pipes 112 and 115 form an airtight and water-tight fit with plates 117 and 119.

The door pairs 35 and 37 are then closed and air is passed into enclosure 45 and the pressure in enclosure 45 reaches a pressure of ½ p.s.i.g. and forms the tractrix shaped roof portions as 140.1–140.9 and raised portions as 141.1–141.10 therebetween. The tangential assemblies as 63.1–63.4 are extensible to provide for substantially equal height of all of the roof portions as 141.9 and 141.10 over the vertical height or level of the assemblies as 110 therebetween. Each of the tractrix shaped portions 140.1–140.9 is convex upward and parabolic in cross section; i.e. the radius of curvature of walls as 140.1–140.9 decreases near its point of support as at 110 and is greatest at the most elevated portions as 141.1–141.18 which most elevated portions are further from points of attachments of layer 42 to assemblies as 110. The horizontal cross sectional area of the dimpled areas as 140.1–140.9 increases exponentially with height over the points of their attachment or restraint as plate 117 of assembly 110.

The operation of the apparatus 20 comprises the steps of forming the downwardly depressed, upwardly open, dimpled or tractrix-shaped roof portions as 140.1–140.9 and upwardly extending convex roof portions as 141.1–141.10 therebetween to form roof reservoirs as 142.1–142.9, then repeatedly charging and discharging such roof reservoirs and the ground reservoirs as 90.1–90.12 with liquid and so passing warmed liquid (as in FIGS. 6 and 13) or cooled (as in FIGS. 14 and 15) therebetween and passing air in contact with the ground reservoirs and thence to the enclosure 45. The concurrent aspects of these operations are shown in FIGS. 6, 13, 14 and 15 and discussed below in connection therewith. The mechanical stages 1–4 are below described and the thermal stages are described in relation to FIGS. 6 and 13 (for warming enclosure 45) and FIGS. 14 and 15 (for cooling enclosure 45).

Stage 1—Charging the Roof Reservoirs

Portions of the water 89 in pipes 86 are pressurized and by the blower 71 acting on the air in tank 83 and such water is driven when required, as below described, from the pipes as 86 up to each of the reservoirs as 142.9, e.g. 142.2, 142.3, 142.4, etc., and stays there, at a predetermined height over the plates as 177 of as assembly 110 as controlled by a float as 147 (or other level control) connected to a valve in pipe 115 to terminate further water flow when the water in the reservoir 142.9 reaches a predetermined level.

Stage 2—Discharge of Roof Reservoir

The water driven as in Stage 1 to reservoirs as 142.9 stays there until the temperature of such portion of water as 145.9 reaches a predetermined level of temperature which level of temperature is sensed by a thermal sensor as 108 in a reservoir as 142.9. Thermal sensor 108 then activates the control relay 87. Relay 87 actuates pump 84 and opens the cut off valve 79 and starts a time delay relay 76 and opens a pressure bleed valve 183 in tank 83: the upper level of water in each reservoir, i.e. the water above the level of opening 113, which opening is, when reservoir 142.9 is full, normally located one to two inches below the top of body of water 145.9, then drains from the reservoir 142.9 and passes by the return lines 103 and 88 and pump 84 to the tanks 81 and 83.

Stage 3—Recharging of Roof Reservoir

Soon after the water level in reservoir 142.9 has fallen (due to such draining as above described and has dropped to the level of the top opening 113 of the high level pipe 112) the time delay relay 76 automatically opens valve 78 and closes valves 183 and 174 and starts pump 71 and closes valve 79. Thereby more water is passed into each of the reservoirs as 142.9 and raises the level of the water therein over the top of opening as 113 of the high level pipe 112 as determined by a level control therefor whereupon the ingress of water of the reservoir then stops until the next cycle of charging.

Stage 4—Charging the Ground Reservoir

Figure 6:
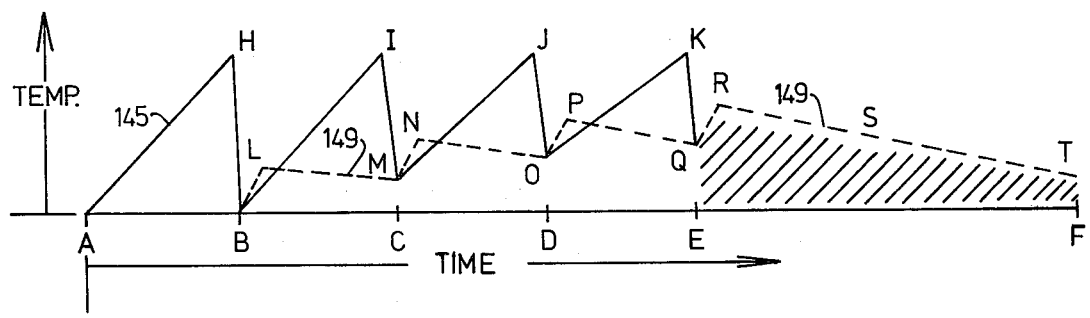
FIG. 6 is a diagrammatic representation relation of operating time of apparatus 20 and the temperature of the water in the roof reservoirs and the ground reservoirs during operation for warming enclosure 45.

The warmed water that has passed from the reservoir as 142.9 to the tank 81 as above described then passes to the conduits as 86 and warms the air in each trench as 90.11 and the ground nearby while that water is cooled. When that water later passes to a reservoir as 142.9 to be further warmed it is warmer than the water initially in line 86; such further warmed water from reservoir 142.9 is passed to tank 81 and then to lines as 86 and further warms the trench accordingly there is a repeated passage of warmed liquid from the reservoirs as 142.9 to the conduits as 86 at progressively higher temperatures as shown in FIG. 6.

The above described steps in stages 1–3 above refer to the steps in heating of enclosure 45 apparatus 20 and also apparatus 220 and 420. The same mechanical sequence of flow control also occurs during the use of apparatus 20 (and 220 and 420) for cooling of enclosure 45. While the Stage 4 description refers to the mechanical stages of the warming cycle, the following refers to the steps for charging the ground reservoir when cooling is desired.

The cooled water that has passed from the reservoir as 142.9 to the tank 81 as above described passes to the conduits as 86 and cools the air in each trench as 90.11 and the ground nearby while that water is warmed. When that water later passes to a reservoir as 142.9 to be further cooled it is cooler than the water initially in line 86; such further cooled water from reservoir 142.9 is passed to tank 81 and then to lines as 86 and further cools the trench; accordingly there is a repeated passage of cooled liquid from the reservoirs as 142.9 to the conduits as 86 at progressively lower temperatures as shown in FIG. 6.

The above described repeated passage of successively treated water at progressively differing temperatures provides particularly efficient methods of transferring energy to the roof layer 40 from the trenches as 90.1–90.10 to establish a heat energy reservoir for transfer of cooled or warmed air to enclosure 45.

FIG. 6 is a diagrammatic representation relation of operating time of apparatus 20 and the temperature of the water in the roof reservoir as 142.9 and the ground reservoir. The temperature of the top levels of water in the reservoirs as 142.9 is shown in the full lines and indicated as 145 while the average temperature of the water as 89 in the conduits as 86 is shown in dashed lines and indicated as 149.

In the first stage of operation between periods of time A and B when the water in the volume 145.9 is being warmed the temperature of water in the reservoirs as 142.9 rises from the level of AB to the level of H. (usually 120°-130° F. on a sunny day)

The level of AB represents also the level of temperature of the water in the trenches as 90.1–90.12 (usually 55°-60° F.).

After the return of the water from the reservoir 142.9 to the trench as 90.11 at time B the average temperature of the water 89 in the conduit 86 rises rapidly from the level AB to the level L then slowly falls as shown by the line L-M to M during which time (B-C) the trench is warmed. In the same period of time (B-C) the water which had been sent to the upper roof reservoir is warmed from the level AB at which it had been while in the conduit 86 in the trench as 90.11 and is warmed to the level I. During this period of time (B-C) the water in the conduit in the trench cools from the temperature level L to the level M while in turn the ground adjacent the trench warms from the temperature level AB upward to the level M because of the warmed water present there.

In the third period of time (CD) water warmed during period B-C is sent from the reservoirs as 142.9 to the pipe 88 and the water warmed in period B-C which had reached the desired temperature at the reservoir 142.9, is passed to conduit 88 then 86 in the trench as 90.11; the temperature of the water, 149, in the conduit 86 then rises in the overall from the level M to the temperature level N; that water further raises the temperature of the trench walls and is concurrently cooled so that the water temperature falls from the level N to the level O while the temperature of the ground surrounding the trench generally rises from the level M to the level O. Concurrently, in this third period of time (C-D) the temperature of the mass of water 145 then passed to the reservoir 142.9 (and all other reservoirs like that on the layer 40) rise in temperature from the level M to the level J. When the water in the reservoir 142.9 has reached the desired value thereof as set by the sensor 108 for discharge therefrom it passes as above described to the pipe 88 and then to the conduit 86 via tanks 81 and 83 as above described.

In the fourth cycle D-E the temperature of water 89 in the conduit 86, which had earlier been at level O is raised by the added mixture thereto at the temperature level J and rises to the level P in the same manner that the temperature of the water 89 in the conduit 86 had initially risen from level M to level N and from level B to level L. During the period of time D-E the temperature of the increments of water passed from conduit 86 to the reservoirs 142.9 and like reservoirs of assembly 40 is heated and rise from temperature level O to temperature level K and the temperature (diagrammatically shown in FIG. 6 as 149) of the water 89 in the conduit 86 falls from the level P to the level Q while warming the walls of the trench as 90.11 from temperature level 0 to temperature level Q.

As diagrammatically illustrated in FIG. 6 the temperature level Q is higher than the temperature level O, the level O is higher than the temperature level N, and the temperature level N is higher than the level B so that there is, accordingly, a successive rise of temperature of water in the trench not withstanding the cooling effect of the trench. The walls of the trench which are formed of earth—but could also be gravel—act as a heat reservoir and are warmed and hold the heat so provided by the warmed water in conduit 86 at the bottom of each of the trenches as 90.1-90.12.

At the termination of this series of cycles as A-B, B-C, C-D, and D-E as might occur at the end of the day the water in the conduit in the trench is left at the temperature level R with the last addition of warmed water from reservoir as 142.9 to pipe 86 (via line 88, pump 84 and tanks 83 and 81); its temperature falls from R to S to T during a long period of time as E to F. The result of the repeated cycling of water between conduits as 86 and roof reservoirs as 142.9 is, for each of the incremental reservoirs, to pass an amount of heat corresponding to the increase in temperature over level E-F (usually 55°-60° F.) by the level QRST (usually above 90° F.) and provides a large amount of heat reservoir action in each of the trenches as 90.11 in view of the large heat capacity of the ground. This amount of heat reservoir in the trench is used to provide warm air to the enclosure 45 during periods when the solar energy is not available to raise temperature of the water in the reservoirs as 142.1-142.9. The blower system 70 provides air to the enclosure 45 by passing air through the thus warm-walled trenches as 90.11 and past pipes as 86 (warmed by warm water as 89 therein from reservoirs as 142.1-142.9) to enclosure 45.

FIG. 14 is a diagrammatic representation relation of operating time of apparatus 20 and the temperature of the water in the roof reservoir as 142.9 and the ground reservoirs. The temperature of the top levels of water in the reservoirs as 142.9 is shown in the full lines and indicated as 145' while the average temperature of the water as 89 in the conduits as 86 is shown in dashed lines and indicated as 149'.

In the first stage of operation between periods of time A' and B' when the water in the volume 145.9 is being evaporated the temperature of water in the reservoirs as 142.9 falls from the level of A'B' to level H' by evaporation to below ground temperature.

The level of AB represents also the level of temperature of the water in the trenches as 90.1–90.12 (The evaporated water is cooler)

After the return of the water from the reservoir 142.9 to the trench as 90.11 at time B the average temperature of the water 89 in the conduit 86 falls rapidly from the level A'B' to the level L then slowly rises as shown by the line L'-M' to M' during which time (B'-C') the trench is cooled. In the same period of time (B'C') the water which had been sent to the upper roof reservoir is cooled from temperature A'B' at which it had been while in the conduit 86 in the trench as 90.11 (by evaporation) to the level I. During this period of time (B-C) the water in the conduit in the trench warms from the temperature level L to the level M' while in turn the ground adjacent the trench cools from the temperature level A'B' down to the level M' because of the cooled water present there.

In the third period of time (C'D') water cooled during period B'-C' is sent from the reservoirs as 142.9 to the pipe 88 and the water cooled in period B'-C' which had reached the desired temperature at the reservoir 142.9, is passed to conduit 88 then to 86 in the trench as 90.11; the temperature of the water 149, in the conduit 86 then falls in the overall from the level M to the temperature level N'; that water further lowers the temperature of the trench walls and is concurrently warm so that the water temperature rises from the level N' to the level O' while the temperature of the ground surrounding the trench generally falls from the level M' to the level O'. Concurrently, in this third period of time (C-D) the temperature of the mass of water 145 then passed to the reservoir 142.9 (and all other reservoirs like that on the layer 40) fall in temperature from the level M' to the level J'. When water in the reservoir 142.9 has fallen to the desired value thereof as set by the sensor 108 for discharge therefrom it passes as above described to the pipe 88 and then to the conduit 86 via tanks 81 and 83 as above described.

In the fourth cycle D-E the temperature of water 89 in the conduit 86, which had earlier been at level O' is lowered by the added mixture thereto at the temperature level J' and falls to the level P' in the same manner that the temperature of the water 89 in the conduit 86 had initially fallen from level M' to level N' and from level B' to level L'. During the period of the time D-E the temperature of the increments of water passed from conduit 86 to the reservoirs 142.9 and like reservoirs of assembly 40 is lowered and falls from temperature level O' to temperature level K' and the temperature (diagrammatically shown in FIG. 14 as 149') of the water 89 in the conduit 86 rises from the level P' to the level Q' while covering the walls of the trench as 90.11 from temperature level O' to temperature level Q'.

As diagrammatically illustrated in FIG. 14 the temperature level Q' is lower than the temperature level O', the level O' is lower than the temperature level N', and the temperature level N is lower than the level B' so that there is, accordingly, a successive fall of temperature of water in the trench not withstanding the heating effect of the trench. The walls of the trench which are formed of earth—but could also be gravel—act as a heat reservoir and are cooled and hold the coolness so provided by the cooled water in conduit 86 at the bottom of each of the trenches as 90.1–90.12.

At the termination of this series of cycles as A-B, B-C, C-D, and D-E as might occur at the end of the night the water in the conduit in the trench is left at the temperature level R with the last addition of cooled water from reservoir as 142.9 to pipe 86 (via line 88, pump 84 and tanks 83 and 81); its temperature rises from R to S to T during a long period of time as E' to F'. The result of the repeated cycling of water between conduits as 86 and roof reservoirs as 142.9 is, for each of the incremental reservoirs, to abstract an amount of heat corresponding to the difference in temperature below level E'-F' of the level QRST (usually above 90° F.) and provides a large amount cooling reservoir action in each of the trenches as 90.11 in view of the large heat capacity of the ground. This amount of heat reservoir in the trench is used to provide cool air to the enclosure 45 during periods when evaporation is not available to lower temperature of the water in the reservoirs as 142.1–142.9. The blower system 70 provides air to the enclosure 45 by passing air through the thus cool-walled trenches as 90.11 and past pipes as 86 (cooled by cool water as 89 therein from reservoirs as 142.1–142.9) to enclosure 45.

As shown in FIG. 13 in an enclosure-heating operation of the apparatus 20 air in a stream 190 enters by pipe 151 and passes through the reservoirs as 90.11 where it meets levels of temperature of pipes as 86 and trench wall between the temperature levels as B and M (at other times or stages in the cycle the temperature met by the air passing through the trench will be at a temperature level between B and R as shown in FIG. 6); thereby the temperature of the air in stream 190 is elevated; and such warm air passes to the pump 71 and thereby into the enclosure 45. Within the enclosure 45 such pumped air develops a pressure adequate to maintain the shape of and separation of elevated portions as 141.1–141.15 and depressed portions as 140.1–140.9 of distinct reservoirs as 142.2 and 142.3. After such reservoirs as 142.9 are produced and maintained (a) warmed water is transferred into heat transfer contact with the conduit 86 at temperatures which decreases as from level L to M with time passage because of heat transfer (192) from pipe 86 to trench 90.11 whereby the temperature of the trench increases from level B to M and (b) because of heat transfer (191) from the sun to the reservoir as 142.9 the water in reservoir 142.9 is increased in temperature from a level B to level I. Such warmed water in the reservoir as 142.9 on reaching a predetermined high temperature as I is then transferred to the pipe 86 whereat it transfers heat—as at (a) above—to reservoir as trench 90.11. Such heat is abstracted by the stream of air 190 passing through the blower system 70 into the enclosure 45 and passes heat as by heat flow 194 to the enclosure 45. Additional to the reservoir effect provided at QRST during the enclosure-heating operation of apparatus 20 above described, solar energy 191 passes to the roof 40 and heats ground as 50 and air there above and such heat is trapped within the enclosure 45. Accordingly, the portion of the roof 40 which is not covered by water reservoirs as 142.5 and 142.9 provide for absorption of solar energy through the roof 40 while the water bodies as 145 provide for absorption and transfer of heat energy to the ground reservoirs for trenches 90.1–90.12 as above described. Also at day when air temperature is below 55°–60° F. the temperature of water at ground temperature (55°–60° F.) in roof reservoirs is 142.2 provides a flow of heat (195) to the enclosure 45 from the heat flow 196 from the trenches as 90.11 to stream 190.

Film 42 is a polymeric imperforate dimensionally stable sheet of polyethylene formed of two firmly joined films with total thickness of about 0.15 millimeters thickness: it is waterproof, has high tensile strength, and is flexible, transparent and reinforced with one group of parallel high tensile strength flexible threads about 1 mm. wide and 0.15 mm thick extending across the layer 42 parallel to each other and spaced apart by 0.33 inches and another like group of threads similarly apart and extending at right angles to the first group and interwoven with the first group and located between and firmly attached to the plastic films as in U.S. Pat. Nos. 3,214,320 and 2,999,041.

As shown in FIG. 15 in an enclosure-cooling operation of the apparatus 20 air in a stream 190' enters by pipe 151 and passes through the reservoirs as 90.11 where it meets levels of temperature of pipes as 86 and trench wall between the temperature levels as B' and M' (at other times or stages in the cycle the temperature met by the air passing through the trench will be at a temperature level between B' and R' as shown in FIG. 14); thereby the temperature of the air in stream 190 is reduced; and such cooled air passes to the pump 71 and thereby into the enclosure 45. Within the enclosure 45 such pumped air develops a pressure adequate to maintain the shape of and separation of elevated portions as 141.1–141.15 and depressed portions as 140.1–140.9 of distinct reservoirs as 142.2 and 142.3. After such reservoirs as 142.9 are produced and maintained (a) cooled water is transferred into heat transfer contact with the conduit 86 at temperatures which increase as from level L' to M' with time passage because of heat transfer (192') from pipe 86 to trench 90.11 whereby the temperature of the trench decreases from level B' to M' and (b)

because of heat transfer (191') to the air from the reservoir as 142.9 the water in reservoir 142.9 is decreased in temperature from a level B' to level I'. Such cooled water in the reservoir as 142.9 on reaching a predetermined low temperature as I is then transferred to the pipe 86 whereat it absorbs heat—as at (a) above—from reservoir as trench 90.11. Such heat is abstracted from the stream of air 190' passing through the blower system 70 from the enclosure 45 and absorbs heat as by heat flow 194' from the enclosure 45.

Additional to the above described evaporative cooling of the ground reservoir above described for cooling which provides a cooling effect on the enclosure 45 the ground reservoirs as trenches 90.1-90.12 provide that the water pumped to the reservoirs as 142.2, 142.3 and 142.9 is initially at ground temperature (55°-60° F.); accordingly, a flow of heat as results from the passage of heat within the enclosure usually at temperatures above 70° F. in the summertime to the cooler water in each of the reservoirs as 142.2 the temperature in the roof reservoirs is between the ground temperature (which is 55°-60° F.) and the temperature of the air (which is substantially higher in the summertime); accordingly, cycling of the stream of air as 190' in the enclosure 45 provides for a loss of heat into the mass of water as 145.2 in reservoir 142.2 and so provides for a cooling effect of the air within the enclosure by conduction and connection.

The very thin layer of water impermeable, air-tight plastic 42 provides excellent heat transfer; accordingly, pumping water into reservoirs as 142.1-142.10 provide for maintaining the roof reservoir temperatures near 55°-60° F. during the summertime by the ready transfer of the heat characteristics of such water over the large surface of heat transfer provided by the tractrix-shaped roof reservoirs to the volume of the enclosure 45 and like structures in assemblies 220 and 420.

The apparatus 220 shown in FIG. 5 comprises a wall 31 in an assembly 30 as in the assembly of FIGS. 1-3, and has trenches as 90.1-90.12 as in FIG. 2 and has vertical posts as 261.1, 261.2, 261.3, 261.4 and 261.5 substantially the same as the vertical posts 61.1-61.5 in the assembly 20. Radially and horizontally extended elevated rails as 262.1, 262.3, 262.5 are firmly supported and located on alternate vertical posts as shown in FIG. 3 and 9 are provided at the top of each post as 261.1, 261.3 and 261.5 and firmly attached thereto. A flexible imperforate air-tight, water-tight plastic layer 242, like 42 reinforced and translucent and freely passing visible as well as ultra violet light, is resiliently attached to the walls 31 in the same manner as layer 42 is attached in the embodiment of apparatus of rails as 262.1, 262.3 and 262.5 whereupon the pressure developed by a blower system as 70 and located in the enclosure 45' provides for supporting the membrane 242 with raised portions as 341.4 and 341.5 in a manner that surrounds dimpled or depressed portions as 340.4 which corresponds in structure and functions to the zones as 140.1-140.9 described above for the apparatus at FIGS. 1-3.

Structures 310.1 and the ends of posts as 261.1 are simliar in structure and function to assemblies 110, 110.1, and 110.2 of assembly 20 and the wall portions 340.2, 241.2 and reservoirs 342.2 correspond to structures 140.2, 141.2 and 142.2 of assembly 20. The apparatus operates as above described in stages 1-4 for apparatus 20 and functions as shown in FIGS. 6, 13, 14 and 15 and above described for apparatus 20.

The apparatus 420 comprises a vertically elongated roof edge support assembly 430, a roof portion 440 like 40, an internal structural support assembly 460, a blower system like 70, and a heat transfer system 110 and an air inlet system like 150.

As shown in FIGS. 11 and 12 in particular the roof edge support assembly 430 comprises a wall structure 434 and tensioning members like 43, a tension support like 48 and a roof sealing member like 44. The wall structure 434 comprises a circular imperforate air-tight rigid vertically extending peripheral wall 431 which is fixed to a foundation and has substantial thickness and rigidity and an air-tight annular horizontally extending raised central wall portion 432. Portion 432 extends centrally and horizontally from the upper end of wall 431. An annular sealing flange like 44 extends centrally and downwards from the lower inner edge of the wall. The bottom of wall 431 is firmly located on the ground 450 in a peripheral wall foundation 451 like 51.

The flexible imperforate roof portion 440 comprises a plurality of upper incomplete portions as 41 and 41.1-41.9 and a lower complete imperforate air-tight flexible yet dimensionally stable layer 442. The lower complete layer 42, shown in FIGS. 11 and 12, extends from one side of the peripheral roof support assembly 430 to the other side thereof as shown in FIG. 12 and past seal as 44 to a peripheral roof edge like 49. The layer 442 is formed into an array of a plurality of downwardly dimpled areas, as 540.1 and upwardly convex areas (as 541.1-541.4). The most peripheral of the raised areas are located by assemblies 460 and 70 to be higher at their highest points as 542.1-542.5 then the portions of layer 442 in contact with the circular seal as 44. An air-tight attachment is used to connect the roof layer 442 to the peripheral wall 431 and form a substantially air-tight enclosure therewith as does layer 42 with wall 31 in assembly 20.

The internal structural support assembly 460 comprises a T-shaped internal frame subassembly 464 arrayed in an axially symmetrical arrangement.

Frame subassembly 464 comprises a central rigid vertically extending support post 461 and rigid rails as 462.1 and 462.2.The vertical post 461 is firmly supported at its lower end in the ground 450 and is rigid and, at its upper end is firmly attached to and support elevated radially and horizontally extending rigid rails as 462.1 and 462.2. Each of the horizontally extending radial rails as shown in FIG. 12 is elevated and in turn supports and is attached firmly to one support an upper thermal fluid conduit terminal support assembly 510 like 110. The assemblies as 510 in 420 provide for location and positioning of the portions of the roof assembly 540 adjacent thereto in the same manner as assemblies 110 and 110.1 and 110.2 in apparatus 20 supported adjacent portion of roof 40.

The blower system 70 comprises an air pump 171, a motor 72 and a pressure control as 73. The pump 71 drives air into the enclosure 445 under the roof 440. The pressure control 73 is sensitive to the pressure in the chamber 445 and is operatively connected to and drives the motor 72. An air tight entrance enclosure 435, comprising a pair of doors 436 and 437 spaced apart by a space 438 and also comprising entrance side walls and enclosing the entrance space 438 provides for ingress to and egress from the ground surface or area within the enclosure 445 under the roof 40 while maintaining the air pressure in the enclosure 445.

The areas 540.1, 541.1 and 44 correspond to the portion 140.1 and 141.1 of assembly 20.

The apparatus 420 encloses an enclosure 445 and the roof reservoirs 542.1, 542.2 and 542.3 of apparatus 420 function and are structured like reservoirs 142.1, 142.2 and 142.3 respectively of apparatus 20. Apparatus 420 also has ground reservoirs as 90.1–90.12 of apparatus 20 and a pump and blower system which, together, provide for heating and cooling the enclosure 445 in the same manner that the components of apparatus 20 provide for heating and cooling the space within enclosure 45 of apparatus 20. Apparatus 420 has a circular elevated rail 502 supported on its peripheral wall 431. One, center, end of an elevated horizontally extending rigid beam 501 is rotatably supported on post 461 and its radial end is movably supported by wheels as 505 attached to the beam 501. An adjustable crane 503 is movably supported on post 461 and rail 501 and is readily moved about within the enclosure 445 in conventional manner. In hot weather the exterior of enclosure 445 is maintained at comfortable temperatures by use of storage of cooled water and ground reservoir water in the same manner as enclosure 45 is cooled by the apparatus 20; in cold weather the enclosure 445 is warmed to temperatures above or close to the ground temperature by use of the roof reservoirs and the ground reservoir as above described for the apparatus 20.

When the process of heating of the enclosure 45 of apparatus 20 (or 220 or 420) is based on solar heating of the waters in the roof reservoirs and there is sufficient solar heating to provide a substantial increased change of temperature of the water as 89 in the conduits as 86 in the ground reservoirs the size of ground reservoirs connected to flow from tank 83 may be reduced so that the change in temperature of these reservoirs to which the warmed water are sent will be greater and a greater difference between the usual or initial trench temperature and the temperature thereof after heat energy has been transferred thereto from the roof reservoirs than if larger reservoirs were used will be produced (as above described).

When heating of the enclosure 45 is desired in particularly cold weather when an enclosure temperature above 40° F. and close to 50° F. are desired and the sun's rays do not provide as much heat to the water as 145 in reservoirs as 142.9 as is lost by such bodies of water as 145 as due to cold winds on overcast days, the waters as 145, on reaching a predetermined minimum lowered value of temperature as sensed by the sensor 108 are sent to trenches of sufficient size and surface area so that the temperature of such waters (as the water as 89 in conduits as 86) are brought up to ground temperature by heat transfer by air stream as 190 contacting such large ground reservoir bodies at ground temperature, and those ground reservoirs have large heat capacities so that the temperature of such reservoirs is not appreciably lowered by the cooled waters added thereto. The system 20 then provides for warming of the water in conduits as 86 to ground temperature as 55°–60° F.; following such warming, such waters at about 55° F. are used to recharge the roof reservoirs and replace the chilled water therein which previously had its temperatures lowered as by cold, heat-absorbing, winds applied thereagainst. Thereby air in enclosure 45 is not exposed to roof surface temperatures in reservoirs as 142.9 lower than those set by sensor 108; thereby heat transfer between the water as 145 in reservoirs as 142.9 on roof surface and enclosure 45 heats the enclosure 45, as such waters are at the temperature of the ground reservoir. This mode of operation may be used during very cold days when the reservoir effect as QRST of FIG. 6 may not be available for heating of the enclosure 45.

When the process of operation of the apparatus 20 to cool enclosure 45 is based on evaporation from the roof reservoirs as 142.9 with relatively little heating of the exposed upper surface of the water in the reservoirs, as when such roof reservoirs are exposed to cool dry night skies, as in the Southwestern parts of the United States, e.g. New Mexico and Texas north of the 33rd parallel with sufficient cooling effect to change the temperature of the ground reservoirs substantially, the size of the ground reservoirs are reduced so that the change in temperature of the ground reservoirs to which water is sent after exposure in reservoirs as 142.9 will be greater and there will be a greater difference between the usual trench temperature and the temperature thereof after heat energy has been transferred between the roof reservoirs and the trenches or ground reservoirs as 90 than if smaller size reservoirs are used. When apparatus 20 is used to cool enclosure 45 and the process of evaporation does not lose as much heat from the water as 145 in reservoirs as 142.9 as is absorbed by such bodies of water as 145 from the sun's rays, as during daylight exposure of roof 40 to the sunlight, the waters 145 after exposure in reservoirs as 142.9 and reaching a predetermined maximum value of elevated temperature, as sensed by the sensor 108, are sent, as above described, to trenches as 90.11 of very large volume and surface area so that the temperatures of waters in conduits thereof as 86 are brought down to ground temperature by heat transfer with air streams as 190' contacting such water after contact with reservoir bodies at ground temperature, because such ground reservoirs have heat capacities that are very large so that their temperatures are not appreciably raised by the warmed waters added thereto: the ground reservoirs of the apparatus in system 20 then provides for cooling the water in conduits as 86; following such cooling such waters are used to recharge the roof reservoirs and replace the water as 145 therein which had previously had its temperature raised by the solar energy applied thereto. Thereby the air in the enclosure 45 is not exposed to roof temperatures in excess of those set by the sensor 108, and heat transfer to the enclosure 45 is effected by heat transfer thereto from roof surfaces that are initially at the temperature of ground reservoirs (55°–60° F.) and do not rise more than a predetermined amount (set by sensor 108) before being replaced by other waters in such temperature ranges and from contact or mixing with air streams emitted from blower system 70, which streams have been brought to approximately the temperature of the ground reservoirs. The apparatus 20 also then, in the overall, cools the enclosure 45 using the temperature of the ground reservoir waters during the warm days when the cooling effect of reservoir produced as above described for producing the conditions of Q',R'S'T' in FIG. 14 above discussed may not be available, and the waters in the incremental roof reservoirs act to protect the enclosure 45 from its temperature rising substantially above the temperatures provided by such waters.

In operation of apparatus 20 an operator as 177 may walk about within enclosure space 45 of apparatus 20 or enclosures 245 or 445 of apparatus 220 and 420 respectively, comfortably in winter or summer. The roof level of apparatus 20 and 220 and 420 as measured by the top of portions as 141.1–141.9 and corresponding parts in apparatus 220 and 240 are substantially horizontal as well as that the height of the bottom of all reservoir portions as 140.0–140.9 are also the same. In apparatus 20 of FIG. 4, the wall 31 has many conduits as 131 therethrough to provide for developing air streams as 133 across roof 40 to facilitate evaporation of liquid on roof 40 when air flow of the wind is not as ample as desired during warm days when cooling of enclosure 45 is desired. Each of the conduits as 131 of which there are many evenly located throughout the entire perimeter of the wall 31 has an outlet 132 into one of the trenches as 90.11. This system has the same air inlet system 150 as does apparatus 20 and one airduct assembly 158.1 shown in FIG. 4 is the same as that shown in FIG. 3.

In FIG. 4 the level of the water in the reservoir 142.9 is shown substantially lowered and there is no disc as 41 because, in the arrangement of apparatus of FIG. 4 evaporation is encouraged for cooling effect. (FIG. 2 shows the disc 41 used to prevent evaporation during use of the apparatus 20 whereas to better heat enclosure 45.) Also, for illustration purposes the level of the body of water is shown as at the top of the pipe 115 and the float 147 is shown off to one side of the hole 146 therein.

The layer 42 is dimensionally stable although flexible; according, the falling of the level of water 145 from the level shown in FIG. 3 down to the level shown in FIG. 4 does not critically change the solid angle as 132 of the bottom layer 42 with respect to the horizontal at the circular zone immediately adjacent to the assembly 110 because of the excess of internal air pressure (usually ½ to 1.0 p.s.i.g) within enclosure 45 over the atmospheric pressure outside of the enclosure; the internal pressure is created by the blower system 70 of apparatus 20 and the air-tight quality of the walls as 31 and roof 40 and the air-tight connection therebetween and the light weight (about ¼ ounce per square foot) of roof panel 42. The internal air pressure is sufficient to support the water of 145 in reservoir 142.9 without change in the shape of the walls because of the very shallow depth of such walls and the shallow depth permits the use of low pressure to support large water surfaces for heat transfer with enclosure 45.

The shape of layer 42 as initially made and the location of holes as 111 therein provide that the distances along the upwardly convex surface portion as 141.–141.9 and 141.11 (in FIG. 2 and FIG. 9) of layer 42 between the points of attachment of layer 42 to assemblies as 110 and 110.1 and 110.2 is greater than the straight or linear distance between its points of attachment of layer 42 to such assemblies (110, 110.1, and 110.2)

The distances between points of attachment of layer 42 on assemblies as 110 near to the edge 49 of layer 42 are also dimensioned to have a greater distance along the surface of layer 42 from low points thereof (as attachments to assemblies as 110) to its attachment to the sealing flange 44 so that the raised portion as 141.1–141.10 forming the ceiling of the enclosure 45 (and like portions of apparatus of enclosure 245 and 445) will have a dimensionally stable and convex upward shape between the low points as 110' and 44 and the dimensionally stable layer 42 above forms the depressed reservoir portion as 140.1–140.9 that provide a substantially uniform ratio of height or volumes of water of 145 in relation to the surface area for heat transfer by and to such boides of water 145 in contact with the layer 42 therebelow. Assuming 75% efficiency of operation and 50 B.T.U. per square foot per hour of solar heat input and 12 foot diameter spot as 142.9, with 12 such spots per each 7,540 square feet of ground area and a 10° F. temperature variation of inside air and storage temperature, and with soil at 100 pounds per cubic foot density and having a storage capacity of 1 B.T.U. per pound per 0° F. and, with a 10° F. temperature variation and 100 pounds per cubic foot there is 1,000 B.T.U. torage per cubic foot of soil; thus, with 7,540 square feet of absorption area (12×3.14×6×50=) 67,824 B.T.U. per hour that would be absorbed or, even with 75% efficiency, an excess of 50,000 B.T.U. per hour is readily be stored in 50 cubic feet of soil. The size of above described ground reservoirs and roof reservoirs will vary as outlined using comparable amounts of thermal energy. Apparatus 420 has square footage of about 7,000 square feet in area 445; apparatus 20 has a square footage of 20,000 square feet in enclosure 45.

I claim:

1. A substantially air-tight enclosure comprising a vertically elongated roof edge support assembly, a roof portion, an internal structural support assembly, a blower system, and a heat transfer system and an air inlet system, said enclosure comprising vertically extending air-tight walls supported on the ground and a roof formed of a thin and flexible water-tight and air-tight sheet supported on said walls, said sheet forming the roof being formed into a regular array of a plurality of dimpled downwardly extending upwardly open incremental roof reservoirs of substantially the same shape and size and holding volumes of water that are shallow and wide and separate from each other and have similar surface-volume characteristics, and an excess of air-pressure in the enclosure over air pressure outside the air-tight enclosure holds some portions of the roof upward to raised positions and a rigid ground-attached frame structure is attached to other portions of the sheet forming said roof reservoirs, said roof reservoirs being connected to upper terminal portions of liquid conduits extending vertically to horizontally extending liquid conduits located in chambers in the ground, walls surrounding said chambers, said chambers and said walls forming ground heat reservoirs, and wherein (a) the roof edge support assembly comprises a wall structure and a tensioning member, a tension support and a roof sealing member, said wall structure comprising a circular imperforate air-tight rigid vertically extending peripheral wall which is fixed to a foundation and has substantial thickness and rigidity and an air-tight annular horizontally extending raised central wall portion that extends centrally and horizontally from the upper end of said peripheral wall, (b) said roof portion comprises said roof and a plurality of shallow bodies of water located on a thin imperforate air-tight flexible yet dimensionally stable sheet and said flexible sheet extends from one side of the roof edge support assembly to the other and is formed into an array of a plurality of downwardly dimpled surfaces and upwardly convex surfaces, (c) said rigid ground attached frame structure comprises a plurality of generally like internal frame subassemblies arrayed in an axially symmetrical arrangement and (d) each frame subassembly comprises a pair of like rigid vertically extending support posts, intermediate radial rails, and tangential rails, and said posts are firmly supported at their lower end in the ground and are rigid and, at their upper ends are firmly attached to and support an elevated radially and horizontally extending rigid rail and said horizontally extending rail supports and is attached firmly to a plurality of rigid, elevated, horizontally and tangentially extending and longitudinally extensible tangential rail assembies, and said tangential rail assemblies support thereonplurality of upper conduit terminal support assemblies, and (e) each said upper conduit terminal support assembly comprises a rigid high level vertical pipe and a rigid low level vertical pipe, an upper rigid clamping plate and a lower rigid clamp plate, the high level pipe and a low level pipe are firmly attached to upper plate, the upper plate and the lower plate are firmly attached together and clamp therebetween a portion of the sheet forming the roof portion, said low level pipe has a automatically closing valve at its upper end, and the upper open end of the high level pipe is higher than the upper open end of the low level pipe (f) said blower system comprising an air pump, a motor and a pressure control arranged so that the pump drives air into the enclosure under said roof, said pressure control being sensitive to the pressure in the enclosure and operatively connects a power source to said motor, and an entrance assembly comprising a pair of closable doors spaced apart by an entrance enclosure which provides for ingress to and egress from a ground surface located within said enclosure under said roof while maintaining the air pressure in said enclosure, (g) said blower having an inlet located in said chambers and two discharge outlets, said first discharge outlet attached by a plurality of air distributor pipes to outlets in said enclosure and said second discharge outlet attached to means for applying pressure to the water in said conduits in said ground heat reservoirs, (h) said air inlet system comprising valved air duct assemblies, each such air duct assembly comprising a first inlet duct with an orifice located outside of the wall; said duct connects to a tee through a valve openable to said enclosure and another arm of said tee connects to said chambers in the ground, and (i) said heat transfer system comprises a heater tank operatively connected to each of said conduits in said chambers in the ground and to said bodies of water in said roof reservoirs.

2. Apparatus as in claim 1 wherein air pressure in the enclosure produces upwardly convex flexible roof layer portions and the height of the top of raised portions of the roof over the bottom of dimpled portions thereof is about one foot and there is ten feet between the centers of said upper conduit terminal support assemblies and each incremental roof reservoir is about one foot deep and holds water to a depth of $9\frac{1}{2}$ to $10\frac{1}{2}$ inches and has a maximum diameter of about six feet and the peripheries of the separate reservoirs are distinct and spaced apart from each other.

3. Apparatus as in claim 1 wherein the distances between said upper conduit support assemblies is 12 feet and the incremental roof reservoirs have a height of 24 inches and a water depth of 17 to 18 inches.

4. Apparatus as in claim 1 wherein rigid ground supported frame structure comprises a central rigid vertically extending support post and said vertical post is firmly supported at its lower end in the ground and at its upper end is firmly attached to and supports elevated radially and horizontally extending rigid rails and each of said horizontally extending rigid rails in turn supports and is attached firmly to an upper conduit terminal support assembly.

5. Apparatus as in claim 4 comprising a circular elevated rail supported on said wall structure and one, center, end of the elevated horizontally extending rigid beam is rotatably supported on said circular rail and an adjustable crane is movably supported on said beam.

* * * * *